United States Patent [19]

Hudson et al.

[11] 4,357,988

[45] Nov. 9, 1982

[54] AIR-CONDITIONING/HEATING SYSTEM

[75] Inventors: David J. Hudson, Cheshire; Willard P. Francis, West Haven, both of Conn.

[73] Assignee: Safety Electrical Equipment Corp., Wallingford, Conn.

[21] Appl. No.: 189,257

[22] Filed: Sep. 22, 1980

Related U.S. Application Data

[63] Continuation of Ser. No. 965,339, Dec. 1, 1978, abandoned.

[51] Int. Cl.³ .............................................. F25B 29/00
[52] U.S. Cl. ........................................ 165/26; 62/180; 62/228; 236/1 EA
[58] Field of Search ...................... 62/228 B, 215, 180, 62/323.3; 236/1 EA; 318/359; 165/43, 26

[56] References Cited

U.S. PATENT DOCUMENTS

| | | | |
|---|---|---|---|
| 1,039,568 | 9/1912 | McLain | 318/359 |
| 2,251,376 | 8/1941 | Ross | 236/91 D |
| 2,289,082 | 7/1942 | Stevenson, Jr. | 236/1 EA |
| 3,475,919 | 11/1969 | Ellis | 62/323.3 X |
| 3,761,018 | 9/1973 | Rekai | 165/20 X |
| 4,041,723 | 8/1977 | Weibel, Jr. et al. | 62/180 X |

OTHER PUBLICATIONS

Industrial Electronics Handbook, Cockerell, McGraw-Hill Co. 1966, pp. 2-246 & 2-247.

*Primary Examiner*—William E. Wayner
*Attorney, Agent, or Firm*—DeLio and Libert

[57] ABSTRACT

A dual capacity air-conditioning/heating system including an evaporator, a blower, a compressor and compressor motor, the compressor motor having a two-speed mode of operation. The compressor motor speeds are changed by changing the shunt field current of the motor to achieve a significant reduction of energy consumption in the low-speed mode of operation. The blower motor has a two-speed mode of operation by changing the series armature resistance thereof.

6 Claims, 7 Drawing Figures

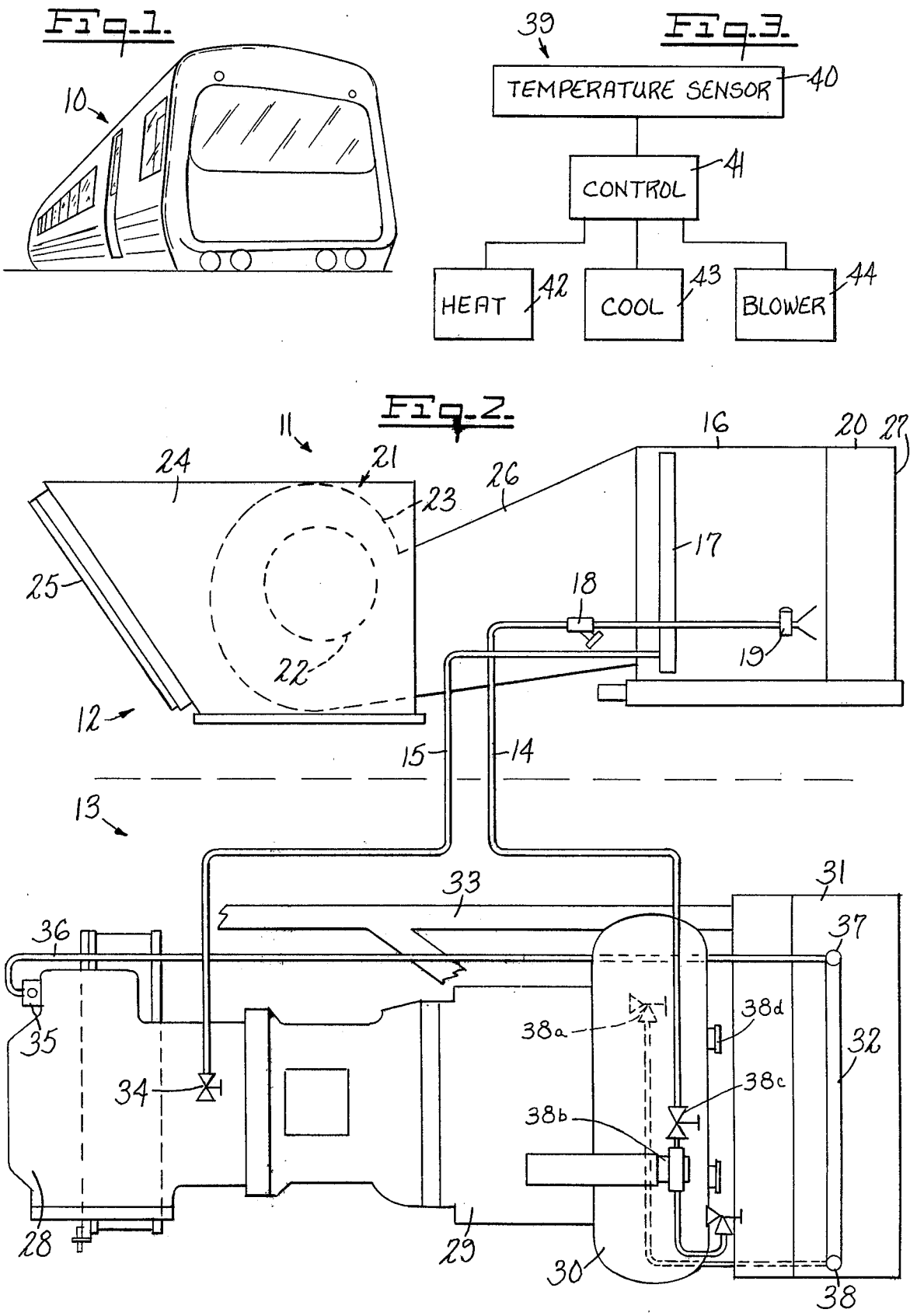

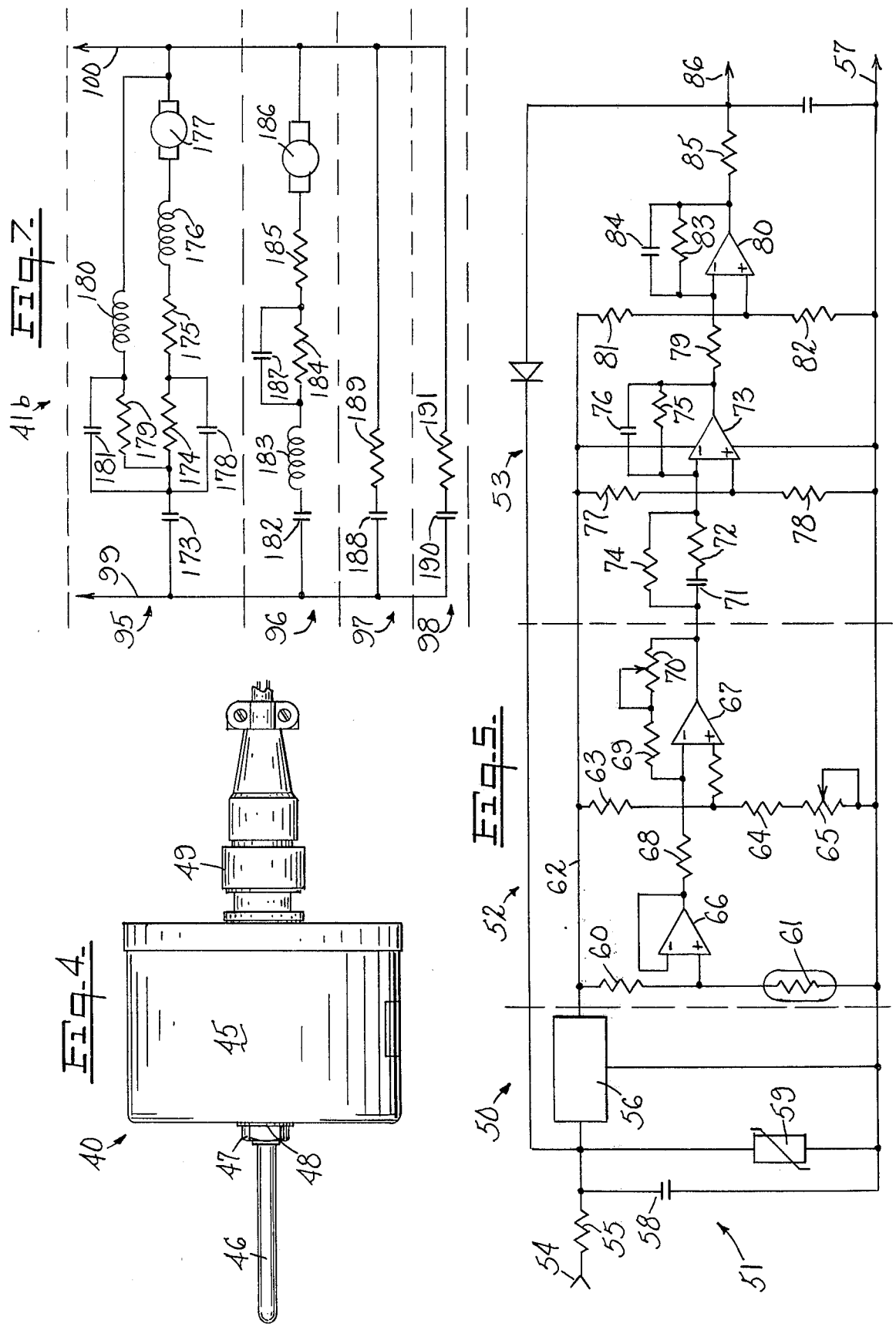

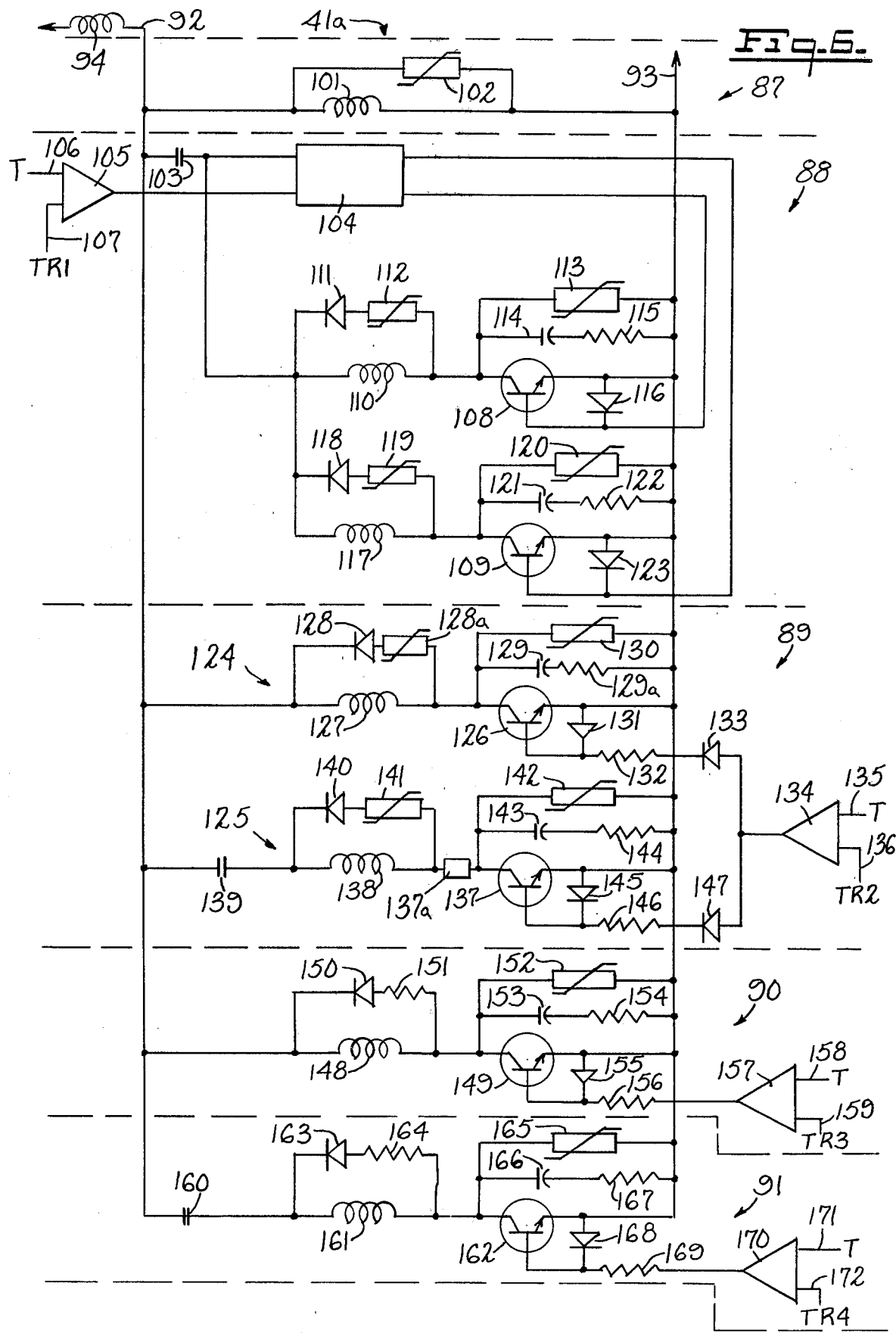

AIR-CONDITIONING/HEATING SYSTEM

This is a continuation application of Ser. No. 965,339 filed Dec. 1, 1978, now abandoned.

BACKGROUND OF THE INVENTION

1. Field of the Invention

The invention relates generally to the field of air-conditioning/heating systems, and more specifically to such systems having multiple capacity.

2. Description of the Prior Art

In typical rapid transit systems using railway cars, buses and the like, the air-conditioning/heating systems are normally designed to have sufficient capacity, that is, heating and cooling power, to handle rush-hour or peak-load heating and cooling demands. During off-peak hours, however, the capacity of the system must be reduced to avoid excess heating and cooling.

A conventional air-conditioning system includes an evaporator with a blower, a compressor, a condenser and a storage tank for a refrigerant fluid. The refrigerant is cyclically pumped from the tank through the evaporator, and the compressor to the condenser, and back to the storage tank. In the evaporator, air is blown through the evaporator coils. The refrigerant pumped through the coils picks up heat from the air, thereby cooling the air. The refrigerant is then cooled in the condenser and returned to the refrigerant storage tank.

In the prior art, when it was desired to change the cooling capacity of the air-conditioning system, a two-feed evaporator was provided having two independent evaporator coils in parallel, one of which could be closed off to reduce the cooling capacity of the system. Also, a compressor was provided, normally of the multiple-piston type, which could be unloaded by closing off certain of the cylinders to reduce the pumping speed of the refrigerant through the compressor.

Such prior art air-conditioning/heating systems, however, use excessive amounts of energy even in the reduced capacity mode. When the speed of the compressor motor is lowered, by varying the series resistance, no significant reduction in energy consumption is realized at the slower speed. Providing the evaporator with a second feed is also expensive and wasteful, because the mechanism provided for the second feed is used only for a small percentage of the time the system is in use.

The present invention provides a dual capacity air-conditioning/heating system having a single circuit evaporator and a two-speed compressor motor, the two speeds being achieved by changing the amount of resistance in series with the shunt field coil, of the motor, thereby changing the current through the shunt field. This achieves a significant savings in the energy consumed during low-speed operation. The reduction in speed of the compressor motor also achieves a significant reduction in the noise from the system. Providing the evaporator with a single feed achieves a significant savings in manufacturing costs of the air-conditioning/heating system.

SUMMARY OF THE INVENTION

It is therefore an object of the invention to provide a new and improved dual capacity air-conditioning/heating system.

It is another object of the invention to provide a new and improved dual capacity air-conditioning/heating system having a two-speed compressor motor in which the speed of the compressor motor is changed by changing the shunt field resistance across the motor, resulting in a significant savings in energy consumption at the lower speed.

It is a further object of the invention to provide a new and improved dual capacity air-conditioning/heating system in which the evaporator has a single feed.

In brief, the invention provides a dual capacity air-conditioning/heating system including an evaporator with blower, a compressor and a condenser. Improvements include utilizing a two-speed compressor motor, with the speed of the compressor being varied by varying the shunt field current of the motor, to achieve a significant lowering of energy consumed during the low-speed operation, and using a single feed evaporator in the system. The system includes an electric heater downstream of the evaporator to provide overhead heating. A heater is also provided along the baseboard or floor of the rapid transit vehicle, the floor heat normally being actuated at a different temperature than the overhead heat.

BRIEF DESCRIPTION OF THE DRAWINGS

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings wherein:

FIG. 1 is a representation of a rapid transit vehicle with which the invention may be used;

FIG. 2 is a schematic diagram of an air-conditioning/heating system embodying the invention;

FIG. 3 is a block diagram of the electronic controls useful with the system shown in FIG. 2;

FIG. 4 is an elevational side view of a temperature sensing device useful with the air-conditioning/heating system shown in FIG. 2;

FIG. 5 is a schematic diagram of the temperature sensor;

FIG. 6 is a schematic diagram of a first portion of a control unit useful with the air-conditioning/heating system according to the invention; and FIG. 7 is a schematic diagram of a second portion of a control unit cooperating with the unit of FIG. 6.

DETAILED DESCRIPTION OF THE PREFERRED EMBODIMENTS

FIG. 1 exemplifies a rapid transit vehicle 10, such as a railway or subway car or the like with which the invention is particularly useful.

FIG. 2 exemplifies an air-conditioning/heating system 11 according to the invention. The system 11 includes a blower/evaporator portion 12 and a compressor/condenser portion 13. The blower/evaporator portion is normally located at the top of vehicle 10, blowing conditioned air into the interior of vehicle 10 from the top. Compressor/condenser portion 13 is normally carried under the vehicle 10. Refrigerant lines 14 and 15 connecting blower/evaporator portion 12 and compressor/condenser portion 13 extend along the sides of vehicle 10.

Blower/evaporator portion 12 includes an evaporator 16 including an evaporator coil 17. Line 14 from the compressor/condenser portion 13 enters evaporator coil 17 through a strainer 18 and an expansion valve 19.

Blower/evaporator portion 12 also includes a blower 21 including a blower motor 22 and fan 23 supported in a housing 24 having an air inlet 25. The blower 21 also includes bellows 26 for directing air from the blower through the evaporator and out air outlet 27.

Blower/evaporator portion 12 also includes an overhead heater 20 downstream of evaporator coil 17. Heater 20 is a conventional electrical resistance heater actuated as described hereinafter.

Compressor/condenser portion 13 includes a conventional compressor 28, a compressor motor 29, a refrigerant storage tank 30 and a condenser 31. Condenser 31 includes condenser coils 32. The components comprising compressor/condenser portion 13 are supported by frame 33.

Line 15 from blower/evaporator portion 12 is connected to compressor 28 through a valve 34. The outlet 35 of compressor 28 is connected by line 36 to the inlet 37 of condenser coil 32. The outlet 38 of condenser coil 32 empties to tank 30 through valve 38a. Tank 30 is connected to line 14 through a filter-drier 38b and valve 38c. A sight glass 38d is provided to allow the refrigerant level in the tank to be observed.

FIG. 3 exemplifies a block diagram of a control unit 39 useful with the air-conditioning/heating system 11 shown in FIG. 2. The control unit 39 includes a temperature sensor 40 and a command unit 41 which actuates a heating portion 42, an air-conditioning (cooling) portion 43 and a blower motor control portion 44.

FIG. 4 exemplifies temperature sensor 40 useful with the invention, including a housing 45 having extending forwardly thereof a temperature probe 46. The temperature probe is preferably placed in the air return duct in vehicle 10. Probe 46 is attached to housing 45 by means of a nut 47 and a washer 48. From the rear of housing 45 extends a connector 49 for electrically connecting temperature sensor 40 to command unit 41.

FIG. 5 exemplifies an electrical circuit 50 for temperature sensor 40 housed in housing 45. Circuit 50 includes a voltage regulator portion 51, a temperature responsive portion 52 and an output portion 53.

Voltage regulating portion 51 includes a positive voltage input 54, an input resistor 55 and a conventional voltage regulator 56. A common terminal 57 is included. A smoothing capacitor 58 and a surge suppressor 59 are provided between the connection between input resistor 55 and voltage regulator 56 and the common terminal.

Temperature responsive portion 52 includes a pair of resistors 60 and 61 between a line 62, the output of voltage regulator 56, and common 57. Resistor 61 is in thermal contact with temperature probe 46 and its resistance is a linear function of its temperature over the temperature range in which air-conditioning/heating system 11 is operating. Resistor 61 may constitute a Linistor, a resistor whose resistance is dependent on its temperature in a linear manner over a preselected temperature region.

Portion 52 also includes a pair of resistors 63 and 64 in series with a variable resistor 65 connected between line 62 and common 57. Resistor 60, Linistor 61 and resistors 63, 64 and 65 constitute a bridge circuit which may be adjusted by varying variable resistor 65. Temperature responsive portion 52 further includes a first operational amplifier (hereinafter "op amp") 66 having its non-inverting input connected to the line between the resistors 60 and 61, and a second op amp 67 having its non-inverting input connected to the line between resistors 63 and 64. The output of op amp 66 is fed back to its inverting input and is also connected through resistor 68 to the inverting input of op amp 67. The output of op amp 67 is further fed back to its inverting input through resistor 69 and variable resistor 70.

The output of op amp 67 is also fed to portion 53, which constitutes a lead-lag circuit. Since the actual ambient temperature inside vehicle 10 leads the response of temperature responsive resistor 61, portion 53 is provided to anticipate the temperature changes up to a preselected frequency of temperature change. Beyond the preselected temperature change frequency, the portion 53 lags the temperature change. The output from op amp 67 is fed to capacitor 71. Capacitor 71 is in turn connected to resistor 72 and the inverting input of op amp 73. A resistor 74 is provided across capacitor 71 and resistor 72. A resistor 75 and capacitor 76 are provided, in parallel, between the output of op amp 73 and the inverting input thereof. The ratio of the impedance of capacitor 71, resistor 72 and resistor 74 determines the amount of lead of the output signal from op amp 73 and therefore the overall time response of the temperature sensor 40.

The non-inverting input to op amp 73 is connected to a voltage divider formed by resistors 77 and 78 between line 62 and common 57. The output of op amp 73 is connected through resistor 79 to the inverting input of op amp 80. The non-inverting input of op amp 80 is connected to a voltage divider formed by resistors 81 and 82. The output of op amp 80 is fed back to the inverting input through parallel combination of resistors 83 and capacitor 84. The combination of resistors 79 and 83 forms a second lag circuit which further causes the output signal, which is taken from op amp 80 through resistor 85 to output 86, to lag behind the signal from op amp 73. When the frequency of the temperature changes is in the normal operating range, the lead from the capacitor 71, resistor 72 and resistor 74 network is sufficient to cause the signal output at output 86 to lead the temperature response of Linistor 61. As the frequency increases, the impedance of capacitor 71 decreases, until the lead is zero when the impedance of capacitor 71 equals the impedance of resistor 72. At higher frequencies, the capacitor 71, resistor 72 and resistor 74 network lags the change of resistance of Linistor 61, causing a further lag at output 86.

FIGS. 6 and 7 exemplify, respectively, a low voltage portion 41a of common unit 41, and a high voltage portion 41b of command unit 41. Low voltage portion 41a includes a blower motor actuating portion 87, a compressor motor starting and running portion 88, a resistance heat actuating portion 89, a compressor motor high-speed actuating portion 90 and a blower motor high-speed actuating portion 91. Portions 87 through 91 are all connected between a positive voltage line 92 and a common line 93. The positive voltage line 92 is connected to a source of voltage (not shown) through a choke coil 94.

High voltage portion 41b includes a compressor motor starting and running portion 95, a blower motor low and high speed summary portion 96, an overhead heater portion 97 and a floor heater portion 98. Portions 95 through 98 are connected between high voltage line 99 and common line 100.

Blower motor actuating portion 87 includes a blower motor contactor coil 101 connected between line 92 and common 93. A surge suppressor 102 is connected in parallel across coil 101.

Compressor motor starting and running portion 88 includes the contacts of a blower motor current contactor 103 between line 92 and a time delay relay 104. The time delay relay 104 is also connected to an op amp 105. One input of 106 of op amp 105 is connected to output 86 of temperature sensor 40. The other input 107 is connected to a voltage reference source (not shown) selected to be a function of the temperature at which time delay relay 104 is to be responsive. The output of time delay relay 104 is connected to the base of running transistor 108 and starting transistor 109. A coil 110 of a compressor motor line contactor is connected between contactor contacts 103 and the collector of transistor 108. A diode 111 and surge suppressor 112 are connected across coil 110. A surge suppressor 113 and a capacitor 114 and resistor 115 are connected between a collector of transistor 108 and common 93. A diode 116 is connected between the emitter of transistor 108 and the base thereof, and the emitter is also connected to common 93.

Compressor starting and running portion 88 further includes a coil 117 of a compressor motor accelerating contactor connected between the collector of transistor 109 and relay contactor 103. A diode 118 and surge suppressor 119 are connected across coil 117. A surge suppressor 120, capacitor 121 and resistor 122 are connected between the collector of transistor 109 and common 93. A diode 123 is connected between the emitter of transistor 109 and base thereof, and the emitter is also connected to common 93.

Heat actuating portion 89 includes a floor heat portion 124 and an overhead heat portion 125. The floor heat is preferably radiant or convection resistance heating. The overhead heat operates in conjunction with the evaporator blower which is on when the overhead heat is on.

Floor heat actuating portion 124 includes a transistor 126 and floor heat contactor coil 127 connected between line 92 and common 93. A diode 128 and surge suppressor 128a are connected across coil 127. A capacitor 129, in series with resistor 129a, and surge suppressor 130 are connected between the collector of transistor 126 and common 93. A diode 131 is connected between the emitter and base of transistor 126, and the emitter is further connected to common 93. A resistor 132 is provided between the base of transistor 126 and the diode 133 which in turn is connected to an op amp 134 having an input 135 connected to the output 86 of temperature sensor 40 and a second input 136 connected to a source of voltage representative of actuating temperature of portion 89.

Overhead heat actuating portion 125 includes a transistor 137, ambient temperature thermostat 137a, overhead heat contactor coil 138 and a blower motor contactor contacts 139 connected in series between the line 92 and common 93. A surge suppressor 142, a capacitor 143 and resistor 144 are connected between the collector of transistor 137 and common 93. A diode 145 is connected between the emitter and base of transistor 137. A resistor 146 and diode 147 are connected between the base of transitor 137 and the op amp 134. The ambient temperature thermostat 137a is responsive to ambient temperatures external to vehicle 10, and actuates at a preselected temperature.

The blower high-speed portion 90 includes a blower speed control relay coil 148 and transistor 149 connected between line 92 and line 93. A diode 150 and resistor 151 are connected across coil 148. A surge suppressor 152, capacitor 153 and resistor 154 are connected between the collector of transistor 149 and the common 93. A diode 155 is connected between emitter and base of transistor 149. A resistor 156 is connected to the base of transistor 149 and is further connected to op amp 157. Op amp 157 has one input 158 connected to output 86 of temperature sensor 40, and a second input 159 connected to a voltage reference (not shown) representative of the preselected temperature at which blower high-speed portion 90 is to be actuated.

Compressor high-speed portion 91 includes one set of compressor motor accelerating contactor contacts 160, a compressor motor speed control contactor coil 161 and a transistor 162 connected between line 92 and common 93. A diode 163 and resistor 164 are connected across coil 161. A surge suppressor 165, capacitor 166 and resistor 167 are connected between the collector of transistor 162 and common 93. A diode 168 is connected between the emitter and base of transistor 162. A resistor 169 is also connected to the base of transistor 162 and is further connected to op amp 170. Op amp 170 has one input 171 connected to the output 86 of temperature sensor 40, and a second input 172 connected to a voltage reference (not shown) which is representative of the temperature at which compressor motor high-speed actuating portion 91 is to be actuated.

With reference to FIG. 7, compressor motor accelerating and running portion 95 includes compressor motor line contactor contacts 173, a starting resistor 174, a buffer resistor 175, a series field coil 176 and compressor motor 29 connected in series between line 99 and common 100. Compressor motor accelerating contactor contacts 178 are connected across starting resistor 174. The speed control resistor 179 and shunt field coil 180 are connected in series between line contactor contacts 173 and common 100. Compressor motor speed control contactor contacts 181, normally closed, are connected across speed control resistor 179.

Blower motor accelerating and running portion 96 includes a blower motor relay contactor 182, a blower motor current relay coil 183, a speed control resistor 184, a buffer resistor 185 and blower motor 121 connected between line 99 and common 100. A blower motor speed relay contactor 187 is connected across resistor 184. Overhead heat portion 97 includes an overhead heat contactor 188 and a heating element 189 in series between line 99 and common 100.

Floor heat portion 98 includes a floor heat relay contactor 190 and a heating element 191 in series between line 99 and common 100.

Heating elements 189 and 191 are preferably electrical resistance heating elements.

In operation, the heating/air-conditioning system 11 has six stages of operation. At the lowest temperature, the floor and overhead heat are on, as is the low-speed blower. At a preselected ambient outside temperature, the overhead heat cuts out and only the low-speed blower and floor heat are on. At a higher preselected temperature, only the low-speed blower is on to provide ventilation. At still higher temperatures, when air-conditioning is called for, at the lower air-conditioning temperatures both the blower and compressor are at low-speed operation. At a higher preselected air-conditioning temperature, the blower goes into high-speed operation and at a still higher preselected temperature, the compressor goes to high-speed operation. The particular temperatures at which these modes occur are matters of design choice, except that the blower must be on at least in its low-speed mode to start the compressor or to allow system 11 to go into the overhead heating mode. In system 11, the blower is always on. Furthermore, the compressor motor 29 is constrained to start in the slow-speed mode.

Temperature sensor 40 controls command unit 41, which in turn actuates the heating mode and the cooling mode.

The operation of temperature sensor 40 will now be described. Resistors 60, 63, 64 and 65 and Linistor 61 constitute a bridge circuit which becomes unbalanced as Linistor 61 changes in value. Variable resistors 65 and 70 also vary the operating balance point of the bridge circuit. Op amps 66 and 67 amplify the unbalance signal from the bridge resistor, which is further amplified by lead-lag circuit 53. The output of op amp 73 leads the output of op amp 67 by a preselected amount depending on the value of the capacitor. Resistor 75 and capacitor 76 cause the signal output from op amp 73 to lag the signal from the capacitor 71, resistor 72 and resistor 74 network. Resistors 79 and 83 and capacitor 84 cause the output of op amp 80 to lag still further. It is preferable, however, that the output signal at output 86 lead the signal caused by Linistor 61 for normal frequencies of temperature change since the response of Linistor 61 lags the actual change in ambient temperature inside vehicle 10. For higher rates of temperature change, the circuit 53 lags the Linistor signal.

The operation of command unit 41 will be described with reference to FIGS. 6 and 7. The low voltage control portion 41a is connected to a source of low voltage preferably on the order of 37½ volts on line 92. Line 99 is connected to a source of high voltage, preferably on the order of 650 volts DC.

When voltage is applied to line 92, the blower motor actuating portion 86 is actuated as follows. Current flows through contactor coil 101. When voltage is applied to coil 101, blower motor relay contactor contacts 182 are closed, permitting current to flow and actuating blower motor 21 in low speed.

When current flows through portion 96, contactor coil 183 is energized, which closes contactor contacts 103 and 139. At this time, compressor starting and running portion 88 and overhead head portion 125 can be actuated. Until contacts 103 and 139 are closed, portions 88 and 125 cannot be actuated.

At the lowest temperatures, both floor heat actuator portion 124 and overhead heat actuator portion 125 of FIG. 6 are actuated and floor heat portion 97 and overhead heat portion 98 of FIG. 7 are actuated. At the lowest temperatures, thermostat 137a is closed. The signal to input 135 from temperature sensor 40 is below the voltage representative of the reference temperature to input 136 of op amp 134. The output of op amp 134 actuates transistors 126 and 137 through diodes 133 and 147, which switches the transistors on to permit current to flow through relay coils 127 and 138. This closes relay contactors 188 and 190 energizing heating elements 189 and 191. With reference to FIG. 2, heating element 189 is contained in electric heater 20. When the heating element is energized, since the blower is on, the air blown by blower 22 to the interior of vehicle 10 is heated by the heating element.

The floor heat is convective heat from the heating element 11, stretched along the baseboards or floor of vehicle 10.

As the ambient external temperature increases, theremostat 137a opens, cutting off overhead heat actuator portion 125. That will leave the blower running and only the floor heat being applied. When thermostat 137a opens, contactor contacts 188 open, preventing current from flowing through heating element 189.

When the temperature signal to input 135 increases above the voltage representative of the reference temperature, the op amp will switch off both transistors 126 and 137. The blower will be left running providing ventilation.

As the interior temperature increases still further, when the temperature signal to input 106 of op amp 105 increases beyond the temperature reference signal applied to input 107 thereof, the time delay relay 104 will actuate, after a first preselected time interval switching on transistor 108, and after a second preselected time interval switching on transistor 109. This permits current to flow through contactor coils 110 and 117 after the respective delay. This closes compressor motor line contactor contacts 173 and compressor motor starting contactor contacts 178. Contactor contacts 178 being actuated shorts across starting resistor 174 which permits compressor motor 177 to start. After a preselected time interval, time delay relay 104 shuts off transistor 109 which de-energizes coil 117 and opens contactor 178. Since contactor 173 is energized, the compressor motor stays on. The initial separate time delays are provided to limit the initial current to the motor 29.

With refernce to FIG. 2, when the compressor motor has been started, the air-conditioning system is actuated. Refrigerant is drawn from tank 30 through line 14 to evaporator coils 17. The blower pushes warm air through the evaporator coils, which causes the air to be cooled and the refrigerant in the evapoartor coils to be heated. The warm refrigerant proceeds through line 15 through valve 134 into compressor 128 where it is pumped through output 35 and line 36 to the condenser 31, where it is cooled. The cooled refrigerant is returned to the storage tank through valve 39.

As the interior temperature inside vehicle 10 continues to increase, the reference temperature on input 159 of op amp 157 will be exceeded, actuating transistor 149. This energizes coil 148 which closes contactor contacts 187, shorting blower motor speed change resistor 184. At this point, blower motor 21 goes into high speed operation.

If the interior temperature increases still further, and exceeds the reference temperature applied to input 172, op amp 170 actuates transistor 162, which in turn energizes coil 161, opening the contacts of accelerating contactor 181. This inserts speed control resistor 179 in the shunt field coil, which accelerates compressor motor 29 to high-speed operation. At this point, both the compressor and the blower motor are operating in the high-speed mode.

The circuit selecting the low-speed and the high-speed modes for compressor motor 29 varies the shunt field current of the motor, reducing it in the low-speed mode. It is expected that the low-speed mode would be useful for most times except for rush hours when the maximum capacity of the system would be necessary. Therefore, a significant energy savings would be expected.

The compressor motor 29 is constructed according to known principles, the armature size and weight and the electrical capacity and wire turns are chosen according to known principles to permit the speed to be varied.

The low speed and the high speed are chosen so that the low speed is approximately 30% less than the high speed. At the high speed, the motor turns at approximately 1600 rpms providing approximately 20 horsepower and at the low speed the motor turns at approximately 1100 rpms supplying approximately 13.1 horsepower. This 30% speed reduction from high speed to low speed provides an approximately 20% reduction in the capacity of the air-conditioning cooling power provided.

Compressor 28 may be of the unload type, in which a portion of the compressor is closed off to decrease pumping volume, if additional reduction of capacity is desired.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What we claim is:

1. A heating and cooling system for a transit vehicle including a condenser, an evaporator, a compressor, and a compressor drive motor forming an air cooling system; a duct for moving air to be treated therethrough, said evaporator positioned in said duct, a driven blower in said duct, a drive motor for said blower, a heater in said duct, a second heating means, means for sensing the ambient temperature and generating a signal proportional thereto, control means for operating said heater, said second heating means, and said blower motor and compressor motor at low and high speeds of operation, said blower motor being operated continuously at least a low speed when said system is operating, said control means being effective to cause said heater, said second heating means to operate and said blower motor to operate when said temperature signal is below a first predetermined value, and to cease operation of said heater when the temperature signal exceeds said first predetermined value; said control means causing said second heating means to cease operation when said temperature signal reaches a second predetermined value; said control means causing said compressor motor and said blower to operate at low speeds when said temperature signal reaches a third predetermined value to increase the blower speed when said temperature signal reaches a fourth predetermined value and to operate said compressor motor and said blower motor to to operate at high speed when said temperature signal reaches a fifth predetermined value.

2. The system in claim 1 wherein said second heating means heats by convection.

3. The system of claim 1 wherein said compressor motor is a direct current motor and has a shunt field and means for changing the shunt field current, the compressor motor having its low-speed mode at a first selected shunt field current and its high-speed mode at a second selected shunt field current.

4. The system of claim 1 further comprising means for initially starting the compressor motor only in its low-speed mode.

5. The system of claim 1 wherein the blower motor is a direct current motor, means for changing the series armature resistance of said blower motor, the motor having a low-speed mode of operation when the armature resistance is at a first selected resistance, and a high-speed mode of operation when the armature resistance is at a second selected resistance.

6. A method of operating a heating and cooling system for a transit vehicle including a condenser, an evaporator, a compressor, a compressor drive motor forming an air cooling system; a duct for moving air to be treated therethrough, said evaporator positioned in said duct, a blower in said duct, a drive motor for said blower, a heater in said duct, a second heating means, means for sensing the ambient temperature in the vehicle and generating a signal proportional thereto, said blower motor and said compressor motor having low and high speeds of operation, said blower motor being operated continuously at least at low speed when said system is operating; operating said heater, said second heating means and said blower motor when the temperature signal is lower than a first predetermined value; operating said second heating means and said blower motor when the temperature signal exceeds said first predetermined value; operating only said blower motor when the temperature signal exceeds a second predetermined value; operating said blower motor and said compressor motor at low speeds when the temperature signal exceeds a third predetermined value; operating said compressor motor at low speed and said blower motor at high speed when the temperature signal exceeds a fourth predetermined value; and operating said compressor and blower motors at high speed when the temperature signal exceeds a fifth predetermined value.

* * * * *